July 27, 1954
M. OSTROWSKI
2,684,669
COMBINATION COOKSTOVE AND DEVICE
FOR CUTTING HOLES THROUGH ICE
Filed Oct. 20, 1952
2 Sheets-Sheet 1
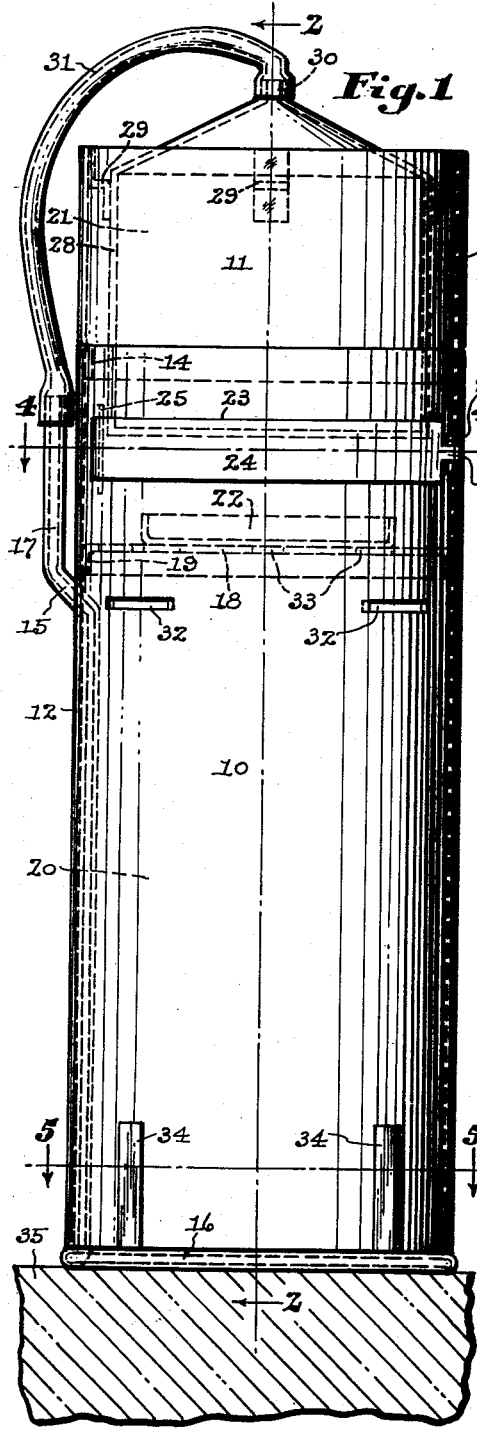
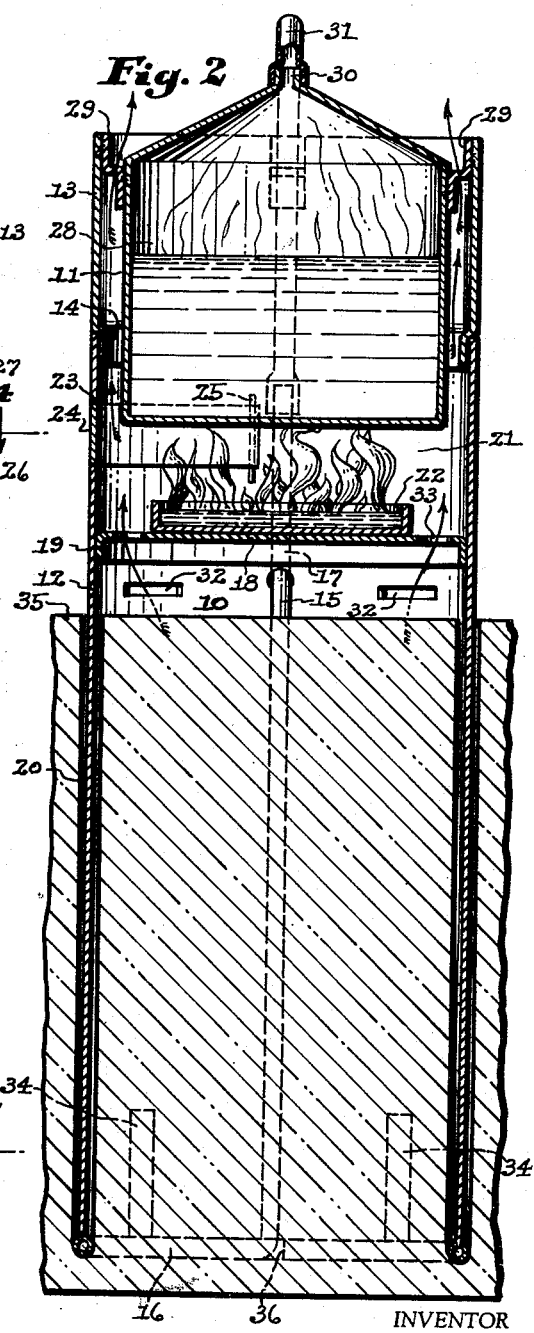
INVENTOR
*Michael Ostrowski*
BY *John S. Braddock*
ATTORNEY July 27, 1954
M. OSTROWSKI
2,684,669
COMBINATION COOKSTOVE AND DEVICE
FOR CUTTING HOLES THROUGH ICE
Filed Oct. 20, 1952
2 Sheets-Sheet 2
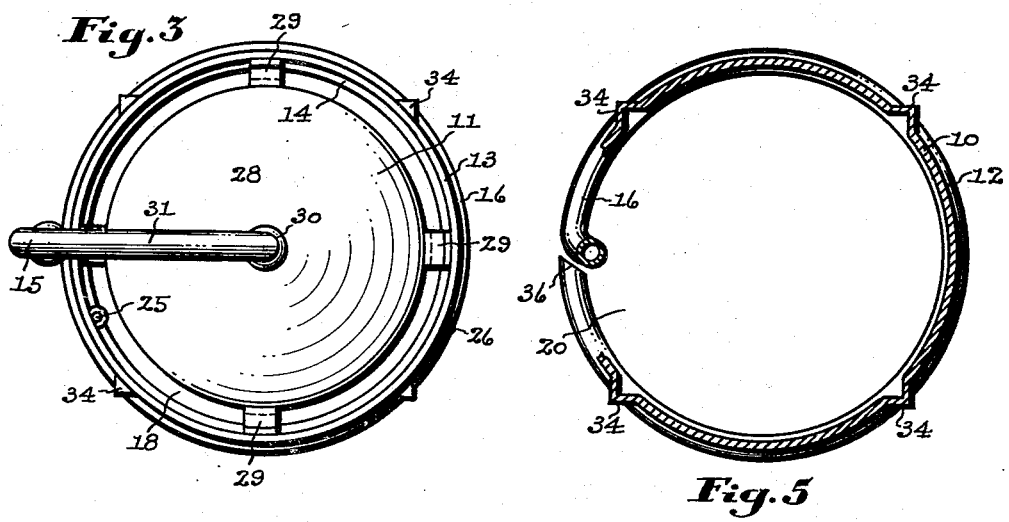
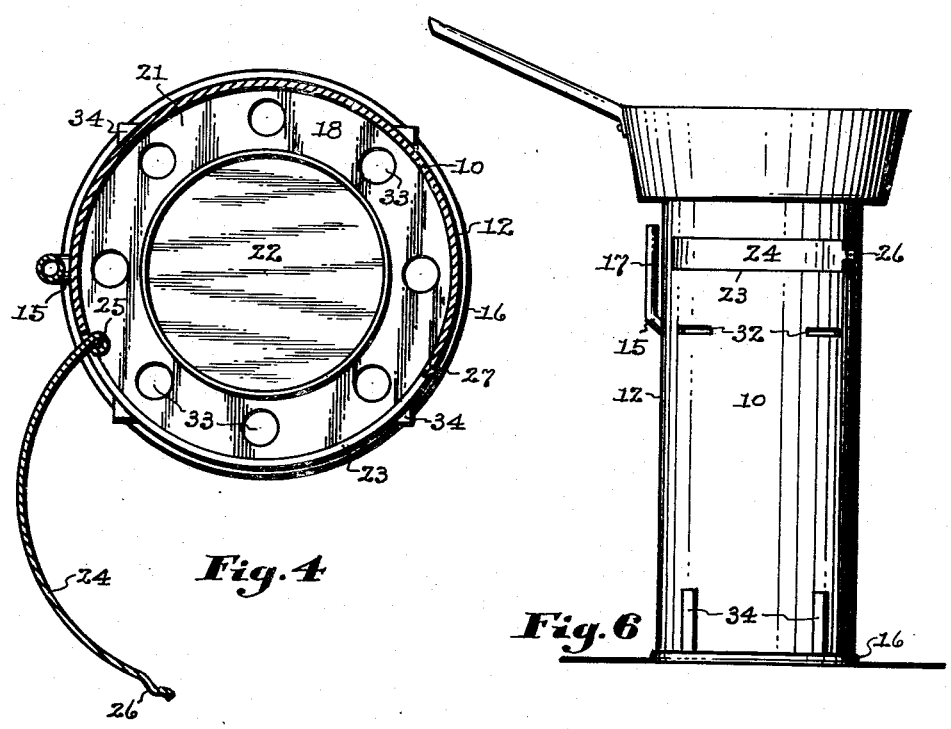
INVENTOR
Michael Ostrowski
BY John S. Braddock
ATTORNEY

UNITED STATES PATENT OFFICE 2,684,669

COMBINATION COOKSTOVE AND DEVICE FOR CUTTING HOLES THROUGH ICE

Michael Ostrowski, Grand Rapids, Mich.

Application October 20, 1952, Serial No. 315,730

2 Claims. (Cl. 126—271.2)

The present invention relates to ice fishing and the objects of the invention are to provide a portable device for cutting holes in the ice for the fisherman to fish through; to provide such a device which will quickly and automatically cut holes through the ice thus eliminating the use of a "spud" or other manually wielded instrument; to provide such a device which may be used alternatively for cutting holes through the ice or for light cooking and coffee-making; and in general to provide such a device which is simple and sturdy in construction, efficient in its intended uses, and reasonably economical in manufacture.

An illustrative embodiment of the invention is shown in the accompanying drawings, wherein:

Figure 1 is a front elevational view of the new device set up for cutting a hole through the ice;

Figure 2 is a vertical sectional view thereof taken on line 2—2 of Figure 1 and shown having cut almost through the ice;

Figure 3 is a top plan view of the device;

Figure 4 is a horizontal sectional view of the same taken on line 4—4 of Figure 1;

Figure 5 is a horizontal sectional view of the same taken on line 5—5 of Figure 1; and Figure 6 is a front elevational view of the device set up for cooking.

Referring now in detail to these drawings wherein like parts of the structure are designated by the same numerals in the several views, the new device generally comprises a hollow cylindrical body element or base 10 on the upper end of which is mounted a boiler element 11. The outer wall 12 of the base and the outer wall 13 of the boiler element are formed of sheet metal and although preferably of cylindrical shape these parts may be of any desired cross-section. The lower end of the outer wall 13 of the boiler element 11 is crimped inwardly at 14 so as to snugly, but removably, fit into the upper end of the base 10 as shown.

A length of metal tubing 15 has its lower portion 16 circularly disposed around the bottom peripheral edge of the base's outer wall 12 and the upper portion 17 of this tubing 15 extends upwardly through the interior of the base 10 and outwardly through the wall 12 near the upper end thereof, and thence again upwardly exteriorly of the base. The tubing 15 may be secured to the base's wall 12 as by welding at various points therealong.

Near the upper end of the base 10 is a horizontally disposed shelf 18 having a depending peripheral flange 19 secured as by welding to the wall 12 of the base. This shelf 18 divides the base into a lower compartment 20 and an upper compartment 21, and the upper compartment 21 serves as a combustion chamber for the device. A fuel pan 22 is removably disposed on the shelf 18, and an opening 23 in the wall 12 of the base provides access for removing the pan 22 to fill it with fuel and for replacing it in the combustion chamber. A door 24 is hingedly mounted on a pin 25 secured as by welding to the wall 12 of the base, said door serving as a closure for the opening 23 and being provided with a catch 26 adapted to engage a keeper 27 on the base for securing the door in closed position when the device is operating.

The boiler element 11 of the device has a boiler 28 mounted therein spacedly from the outer wall 13 of the boiler element as by means of brackets 29 secured by spot welding to the outer surface of the boiler and to the inner surface of the boiler element's outer wall 13. The upper part of the boiler 28 is tapered upwardly and terminates in a tubular spout 30, and a length of flexible tubing 31 is provided for detachably connecting the spout 30 to the upper end of the tubing 15 on the base.

Vents 32 are provided in the outer wall 12 of the base 10, and other vents 33 are provided in the shelf 18, so that air may circulate freely through the device as indicated by the arrows in Figure 2. Near the lower end of the base 10 the outer wall thereof is formed outwardly at several points to form guides 34 the purpose of which is hereinafter described.

Operation

The device is set up as shown in Figures 1 through 5 for cutting a hole through the surface ice 35 of a pond, lake or the like. The device may be made in any dimensions depending upon the size of the hole to be cut and the probable thickness of the ice to be cut through. The boiler 28 is partly filled with water, the tubing 31 is set in place, the fuel pan 22 is filled with a suitable fuel of the "canned heat" or alcohol type and ignited, and the door 24 is closed. Heat from the burning fuel circulates upwardly and around the boiler 28, quickly bringing the water therein to a boil. Steam passes through the tubing 31 and tubing 15 and around the circular lower portion 16 of the tubing 15 and is discharged at the end 36 of said tubing 15. The lower portion 16 of tubing 15 is thus quickly heated and penetrates the ice, cutting a round hole therethrough. As the device descends the guides 34 maintain it in a perpendicular position.

The device may also be used as a cooking stove by simply removing the boiler element 11 and flexible tubing 31 from the base 10, as illustrated in Figure 6.

It will thus be seen that a simple, convenient and efficient adjunct to ice fishing has been provided by this invention, and while but one specific embodiment of the invention has been herein shown and described, it will be understood that numerous details thereof may be altered or omitted without departing from the spirit of the invention as the same is defined by the following claims.

I claim:

1. A device for cutting holes through ice comprising: a hollow body having an upstanding closed outer peripheral wall and an open bottom circumscribed by a lower peripheral edge lying in a plane at substantially right angles to said wall, a tube on said lower peripheral edge and substantially coextensive therewith, a boiler mounted on top of the hollow body, a shelf disposed in the upper part of the hollow body and beneath said boiler for supporting fuel, a door opening through the wall of the hollow body giving access to said shelf, and a conduit connecting the boiler with said tube for conducting heated fluid from the boiler to the tube.

2. A combination cookstove and device for cutting holes through ice comprising: a hollow body having an upstanding closed outer peripheral wall and an open bottom circumscribed by a lower peripheral edge lying in a plane at substantially right angles to said wall, a tube on said lower peripheral edge and substantially coextensive therewith, a boiler mounted on top of the hollow body, a shelf disposed in the upper part of the hollow body and beneath said boiler for supporting fuel, a door opening through the wall of the hollow body giving access to said shelf, and a conduit connecting the boiler with said tube for conducting heated fluid from the boiler to the tube, said boiler and said conduit being removable from said hollow body.

References Cited in the file of this patent

UNITED STATES PATENTS

| Number | Name | Date |
|---|---|---|
| 675,919 | Arvonen | June 11, 1901 |
| 1,584,921 | Gee et al. | May 18, 1926 |
| 1,992,305 | Love | Feb. 26, 1935 |
| 2,623,149 | Amar | Dec. 23, 1952 |